United States Patent
Vass et al.

(10) Patent No.: US 9,268,530 B2
(45) Date of Patent: Feb. 23, 2016

(54) SIGNAL PROPERTY DETECTOR

(75) Inventors: Jiri Vass, Prague (CZ); Jiri Rojicek, Prague (CZ); Vladimir Bicik, Prague (CZ)

(73) Assignee: Honeywell International Inc., Morris Plains, NJ (US)

( * ) Notice: Subject to any disclaimer, the term of this patent is extended or adjusted under 35 U.S.C. 154(b) by 757 days.

(21) Appl. No.: 13/468,910

(22) Filed: May 10, 2012

(65) Prior Publication Data

US 2013/0304261 A1    Nov. 14, 2013

(51) Int. Cl.
| F24F 11/00 | (2006.01) |
| G05B 23/00 | (2006.01) |
| G06F 7/58  | (2006.01) |

(52) U.S. Cl.
CPC . *G06F 7/58* (2013.01); *F24F 11/00* (2013.01); *G05B 23/00* (2013.01)

(58) Field of Classification Search
CPC combination set(s) only.
See application file for complete search history.

(56) References Cited

U.S. PATENT DOCUMENTS

| 4,949,396 | A  | * | 8/1990  | Chung          | 455/216   |
| 5,311,446 | A  | * | 5/1994  | Ross et al.    | 700/280   |
| 5,550,752 | A  | * | 8/1996  | Federspiel     | 700/277   |
| 5,572,588 | A  | * | 11/1996 | Weng et al.    | 379/386   |
| 5,619,581 | A  | * | 4/1997  | Ferguson et al.| 381/71.12 |
| 5,719,788 | A  | * | 2/1998  | Seborg et al.  | 702/179   |
| 5,915,473 | A  | * | 6/1999  | Ganesh et al.  | 165/222   |
| 6,145,751 | A  | * | 11/2000 | Ahmed          | 236/51    |
| 6,719,625 | B2 | * | 4/2004  | Federspiel     | 454/256   |
| 7,024,254 | B2 | * | 4/2006  | Salsbury et al.| 700/55    |
| 7,289,936 | B2 | * | 10/2007 | Singhal et al. | 702/182   |
| 7,505,877 | B2 | * | 3/2009  | Salsbury       | 703/2     |
| 7,542,876 | B2 | * | 6/2009  | Singhal et al. | 702/185   |
| 7,809,668 | B1 | * | 10/2010 | Smith et al.   | 706/47    |
| 7,865,334 | B2 | * | 1/2011  | Singhal et al. | 702/185   |
| 2003/0153986 | A1 | * | 8/2003 | Salsbury et al. | 700/11   |
| 2007/0185686 | A1 | * | 8/2007 | Singhal et al.  | 702/185  |
| 2010/0187832 | A1 | * | 7/2010 | Holland et al.  | 290/1 A  |

OTHER PUBLICATIONS

Jiri Vass, Jana Trojanova, Radek Fisera, Jiri Rojicek, "Embedded Controllers for Increasing HVAC Energy Efficiency by Automated Fault Diagnostics", GREEMBED, Jul. 1, 2010.*
Kariwala V., Chaudhury S., Shah S., Forbes F., Meadows E., "Detection and Diagnosis of Plant-wide Oscillations: An application study", Department of Chemical and Materials Engg., University of Alberta, Canada, Proceedings of IEEE, 2004.*
Vass J., Trojanova J., Fisera R., Rojicek J., "Embedded Controllers for Increasing HVAC Energy Efficiency by Automated Fault Diagnostics", Honeywell Prague Laboratory, ACS, GREEMBED Workshop, Stockholm, Apr. 12, 2010.*

* cited by examiner

*Primary Examiner* — Sean Shechtman
*Assistant Examiner* — Steven Garland
(74) *Attorney, Agent, or Firm* — Schwegman Lundberg & Woessner, P.A.

(57) ABSTRACT

A property of a signal may be detected by sampling a signal and determining a scalar indicator of the samples. The samples can be transformed to create a transformed signal. A scalar indicator of the transformed signal may be determined and compared to the scalar indicator of the sample. If the comparison yields a number greater than a selected threshold value then the signal that was sampled may be deemed to include the property. A property indicator signal may be driven low or high to indicate that the signal has the property. The time and duration of time that the signal is deemed to include the property may be recorded. The recorded data may be reviewed and appropriate action may be taken.

14 Claims, 6 Drawing Sheets

SIGNAL PROPERTY DETECTOR

BACKGROUND

Prior attempts at automated control may be based on sampling data relatively fast. Controllers may have a tendency to modulate actuators too frequently or turn equipment on and off more than is necessary, thus wearing down actuators and other equipment that is moving more often than it needs to. This increase in powering actuators on and off can also increase energy wastage. These problems may be caused by non-optimal values programmed into the controller. Some buildings utilize hundreds of these control loops, thus making the energy wastage and premature part wear quite costly.

SUMMARY

A method includes sampling an oscillation detector input signal at least twice, with a period of time between samples, to create a sampled signal. The sampled signal may be transformed to create a transformed signal. A scalar indicator of the sampled signal and a scalar indicator of the transformed signal may be computed. The scalar indicator of the transformed signal may be compared to the scalar indicator of the sampled signal to determine if the input signal is oscillating.

An apparatus includes an oscillation detector comprising a sample module that samples an oscillation detector input signal to create a sampled signal, a signal transformation module, wherein the signal transformation module transforms the sampled signal to create a transformed signal, a scalar indicator module, wherein the scalar indicator module determines a scalar indicator of the transformed signal and a scalar indicator of the sampled signal, and a comparison module, wherein the comparison module compares the scalar indicator of the transformed signal to the scalar indicator of the sampled signal to determine if the input signal is oscillating.

DETAILED DESCRIPTION

Figure 1:
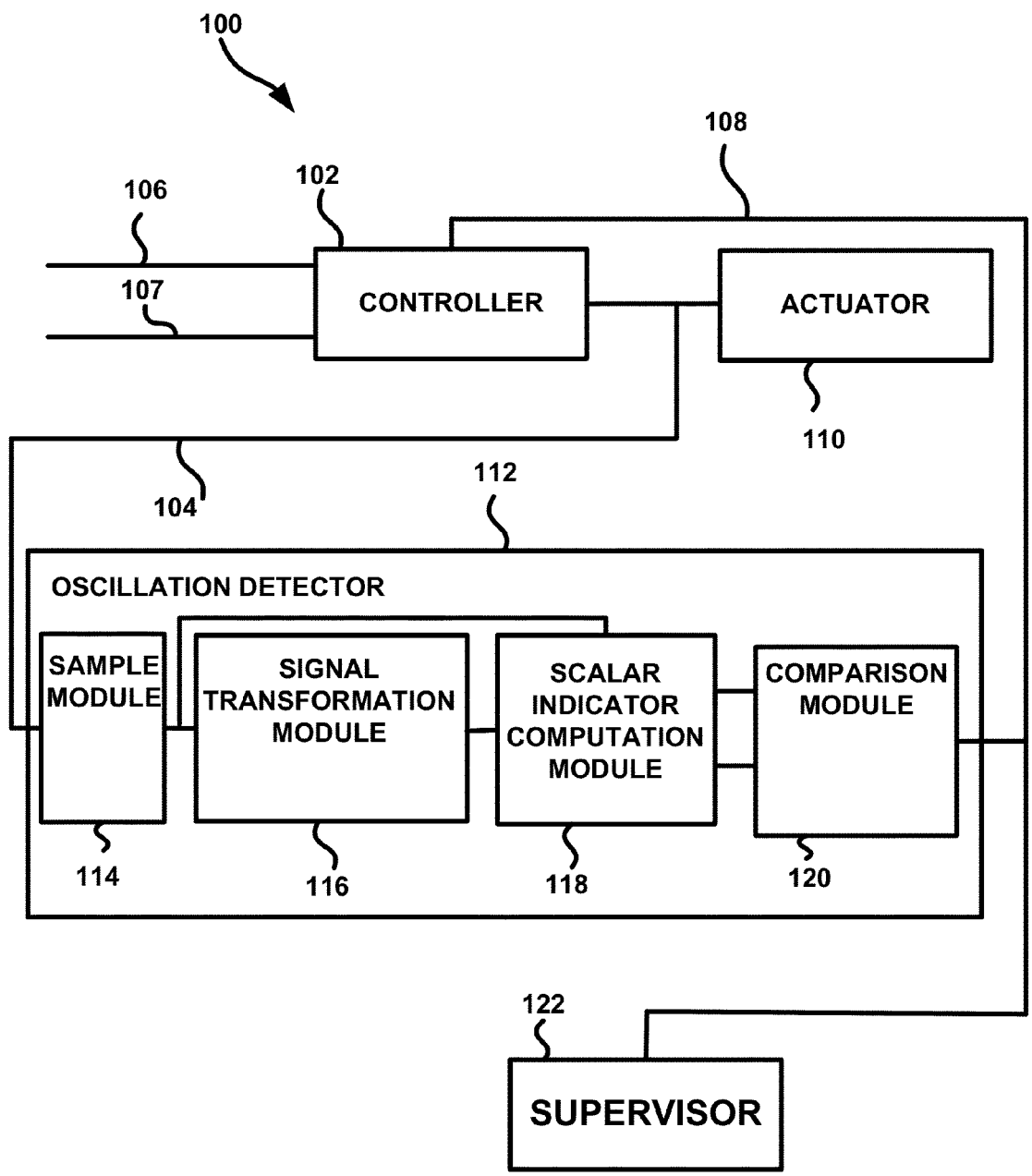
FIG. 1 is a block diagram of an oscillation detector system, according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software stored on a storage device, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A property of a signal may be detected by sampling a signal and determining a scalar indicator of the samples. The samples can be transformed to create a transformed signal. A scalar indicator of the transformed signal may be determined and compared to the scalar indicator of the sample. If the comparison yields a number greater than a selected threshold value then the signal that was sampled is deemed to include the property. A property indicator signal may be driven low or high to indicate that the signal has the property. The time and duration that the signal is deemed to include the property may be recorded. The recorded data may be reviewed and appropriate action may be taken.

Ratio based indicators may be used to detect a property of a signal indirectly. An input signal, x, may be transformed using transformation operator T to yield T(x). The transformation operator T may suppress a property (e.g., frequency component, magnitude, etc.) of x. It may be desired to detect the property. A scalar indicator of both T(x) and the original input signal, x, may each be calculated to yield S(T(x)) and S(x), respectively. The scalar indicator may be responsive to the property to be detected. By calculating a ratio of the scalar indicators S(x)/S(T(x)) the property may be detected. The detection is indirect since the property to be detected is not present in the denominator, but is present in the numerator. It may be desired to avoid divide by zero errors so a constant may be added to the denominator. Also, to keep the ratio relatively accurate, the same constant may be added to the numerator. The first and second constants may be selected sufficiently small so as to allow the property to be detected indirectly. If the first or second constant is chosen to be too large then the constant may mask if the property is present in the signal by either increasing or decreasing the value of the ratio.

A property that may be detected is an oscillatory behavior of a signal. The signal being monitored may be a control signal in a control loop. By detecting control loop oscillations a supervisor may be informed that there is a problem in a control loop. If a control loop oscillation is detected the supervisor may reprogram the controller to have more accurate values than the controller had previously, thus reducing the number of times an actuator is activated. The reduction in actuator activations may reduce the wear on an actuator and extend the life of the actuator. The reduction in activations may also reduce energy wastage and power consumption of a system or apparatus.

Control loop oscillations may be detected by sampling a signal in the control loop (e.g., a control signal) and determining a scalar indicator of the samples. The samples can be transformed to create a transformed signal. A scalar indicator of the transformed signal may be determined and compared to the scalar indicator of the sample. If the comparison yields a number greater than a selected threshold value then the signal that was sampled is deemed to be oscillating. An oscillation indicator signal may be driven low or high to indicate that the signal is oscillating. Records of the time and duration of oscillations may be logged for review by a supervisor which may reprogram the controller to have more accurate variables for the system and environment it is used in.

FIG. 1 is a block diagram depiction of an oscillation detector system 100 according to an example embodiment. An oscillation detector system may comprise a controller 102 and an oscillation detector 112.

Controller 102 may receive a controller input 106 and/or controlled variable set point 107 and produce a control signal 104 that is received by an actuator 110 and the oscillation detector 112. In an example, controller 102 may be any type of feedback or feed-forward controller. In another example, controller 102 may be one of an on-off, staging, modulating, industrial, proportional, open-loop, supervisory, or any other type of controller. In yet another example, controller 102 is a proportional-integral-derivative (PID) controller.

The control signal 104 may generated by controller 102 based on the difference between the controlled variable signal 106 and the controlled variable set point 107. In an example, control signal 104 may be a damper position control signal, cooling/heating coil valve control signal, supply/return fan control signal, pump control signal, boiler control signal (firing rate), or any other control signal.

The controller input 106 may be a manipulated variable such as temperature, pressure, volume, or any other variable that can be regulated by a controller. In an example, manipulated variable 106 may be a supply air temperature, hot water supply temperature, fan/pump speed, or the like. Controlled variable set point 107 may represent the desired (target) value of the given controller input 106. For example, the controlled variable set point 107 may be a supply air temperature set point, hot water supply temperature set point, fan/pump speed set point, and the like. In another example, the set point may be a temperature floor/ceiling below/above which the controller should send an appropriate control signal 104 to actuator 110.

Controller 102 may receive oscillation detector output 108. In an example, controller 102 may become aware that the control signal 104 is oscillating through an indication from oscillation detector output 108. In another example, controller 102 adjusts a programmed variable in response to oscillation detector output 108 indicating that the control signal 104 is oscillating.

Actuator 110 may be a damper, valve, or any other type of actuator. The actuator may help control environmental conditions of a building, for instance. Actuator 110 may be driven by a motor, in an example.

Oscillation detector 112 may comprise a sample module 114, a signal transformation module 116, a scalar indicator computation module 118, and a comparison module 120. Oscillation detector may receive a control signal (an oscillation detector input signal) 104 and produce an oscillation indicator signal (an oscillation detector output signal) 108.

Sample module 114 is operable to sample control signal 104. The samples taken by sample module 114 may be separated by any amount to time. In an example, sample module 114 samples control signal 104 relatively slowly (e.g., somewhere between about once every one minute and about once every ten minutes). Sample module 114 may create a sampled signal that is coupled to signal transformation module 116 and scalar indicator computation module 118.

Signal transformation module 116 is operable to transform a sampled signal from sample module 114 into a transformed signal. In an example, the transformation performed by transformation module 114 suppresses some frequency content of the sampled signal. In one example, suppressing the frequency content of the sampled signal may include linear operations such as low-pass filtering, high-pass filtering, band-pass filtering, multiple band-pass filtering, band-stop filtering, multiple band-stop filtering, wavelet-based filtering or any combination thereof. In another example, suppressing the frequency content of the sampled signal may include performing non-linear operations on the sampled signal such as trimming, moving median filtering, de-trending, saturation, cepstrum filtering or any combination thereof. In another example, linear and non-linear operations are both performed on the sampled signal by signal transformation module 116. An output of signal transformation module 116 may be coupled to scalar indicator computation module 118.

Scalar indicator computation module 118 is operable to calculate a scalar indicator of both the sampled signal and the transformed signal. In an example, the scalar indicator computed is responsive to signal oscillations (e.g., the signal indicator value changes as a signal oscillation changes magnitude or frequency). In an example, scalar indicator computation module 118 may calculate a scalar indicator that indicates a value of central tendency, dispersion, shape, or other statistics of an input signal. A value of central tendency, in an example, may include arithmetic mean, geometric mean, harmonic mean, median, midrange, or mode. A value of dispersion may include standard deviation, variance, median deviation (e.g., median absolute deviation), average deviation (e.g., average absolute deviation), central moment (e.g., central moment of order n, where n is an integer), range, or interquartile range. A value of shape may include skewness, kurtosis, percentile, quartile, quantile, or moment (e.g., moment of order n). Other statistics which may be computed by scalar indicator computation module may include minimum, maximum, sum, power, crest factor, Q-squared statistics, or D-stat from the Kolmogorov-Smirnov test. The outputs of the scalar indicator computation module may be coupled to comparison module 120.

Comparison module 120 is operable to compare inputs received from scalar indicator computation module 118. In an example, comparison module calculates a ratio, the ratio being the scalar indicator of the sampled signal divided by the scalar indicator of the transformed signal. A ratio, according to an example, can be (a first positive constant+scalar indicator of the sampled signal)/(a second positive constant+scalar indicator of the transformed signal). In an example, the first and second positive constants may be the number one. By using the transformed signal in the denominator the property being monitored may be detected indirectly. Comparison module 120 may produce the oscillation detector output 108. Oscillation detector output 108 may be coupled to the controller 102 and/or a supervisor 122.

Comparison module 120 may be operable to determine if a ratio exceeds a selected threshold. In an example, the selected threshold may be selected by authorized personnel or preprogrammed to a default value. In another example, the selected threshold may be chosen such that when an undesirable amount of a certain property is detected to be present the oscillation detector output signal is driven high or low.

Supervisor 122 may be operable to log or monitor the state of the oscillation detector output 108. In an example, supervisor 122 records when the oscillation detector indicates that a signal is oscillating. In one example, supervisor 122 records the duration that the oscillation detector output indicates that the signal has been oscillating. Supervisor 122, in an example, is a person monitoring the oscillation detector output. In another example, the data recorded by supervisor 122 is reviewed by an entity. The entity may determine if a controller should be reprogrammed. Reprogramming the controller may help increase the lifespan of an actuator by eliminating unnecessary activations of the actuator and reducing the number of activations. Reprogramming the controller may help reduce energy wastage by reducing the number of times an actuator is activated.

Figure 2:
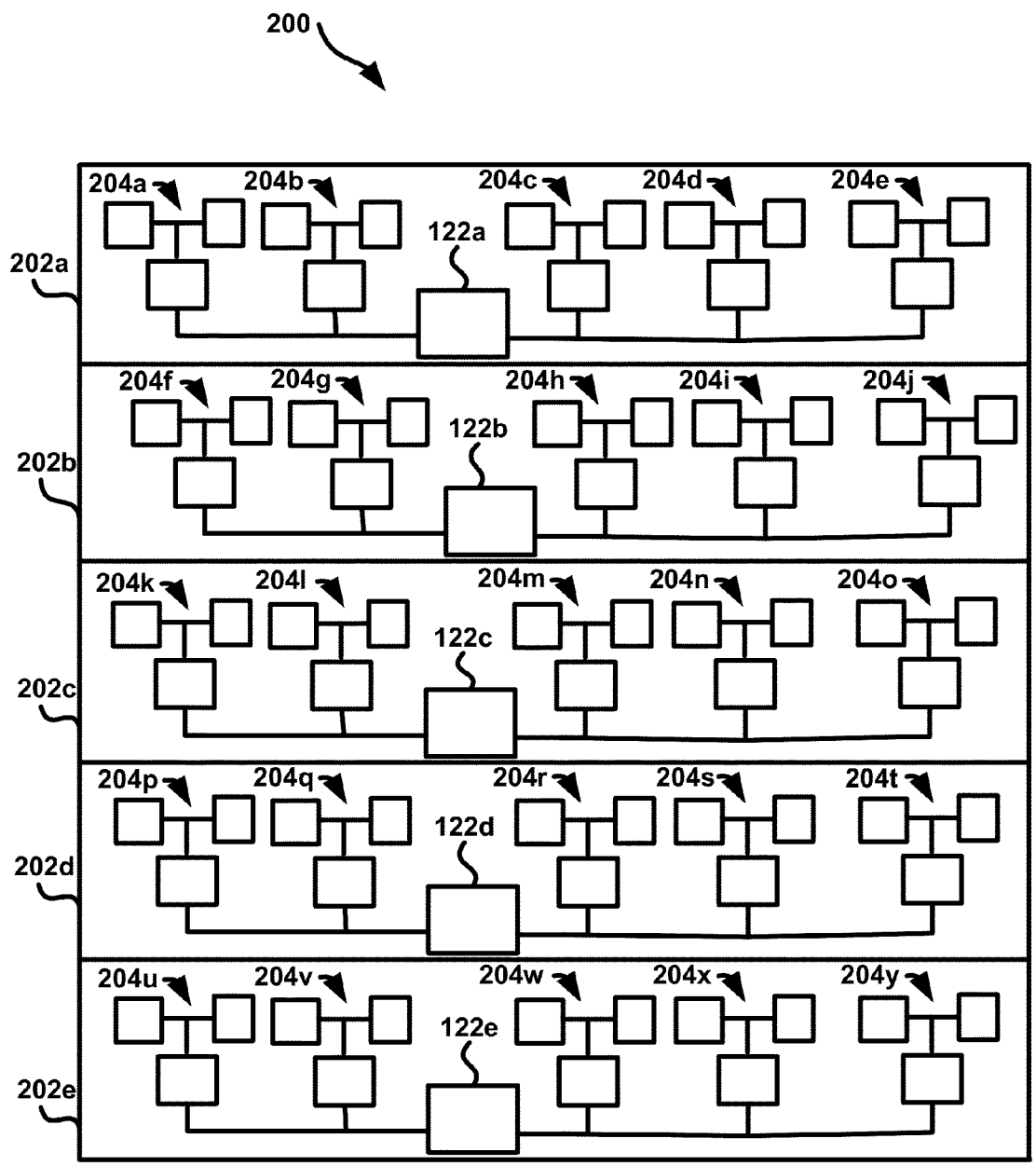
FIG. 2. is a block diagram of a building including multiple oscillation detector systems, according to an example embodiment.

FIG. 2 is a block diagram depiction of a building 200 with five floors 202a-e, multiple oscillation detector systems 204a, 204b, 204c, 204d, 204e, 204f, 204g, 204h, 204i, 204j, 204k, 204l, 204m, 204n, 204o, 204p, 204q, 204r, 204s, 204t, 204u, 204v, 204w, 204x, and 204y, and multiple supervisors 122a, 122b, 122c, 122d, and 122e. Each floor 202a, 202b, 202c, 202d, and 202e may include multiple oscillation detector systems and a supervisor. An oscillation detector system may comprise a controller, actuator and oscillation detector. In an example the oscillation detector systems 204a, 204b, 204c, 204d, 204e, 204f, 204g, 204h, 204i, 204j, 204k, 204l, 204m, 204n, 204o, 204p, 204q, 204r, 204s, 204t, 204u, 204v, 204w, 204x, and 204y, may be substantially the same as the oscillation detector system 100 shown in FIG. 1.

While FIG. 2 depicts each floor 202a-e as having five oscillation detector systems, it should be appreciated that any number of oscillation detector systems may be included to detect oscillations. It should also be appreciated, that any number of supervisors may be used, even though FIG. 2 depicts each floor 202a-e as including one supervisor. For instance, each oscillation detector system may include its own supervisor or there may be a single supervisor for the building.

Figure 3:
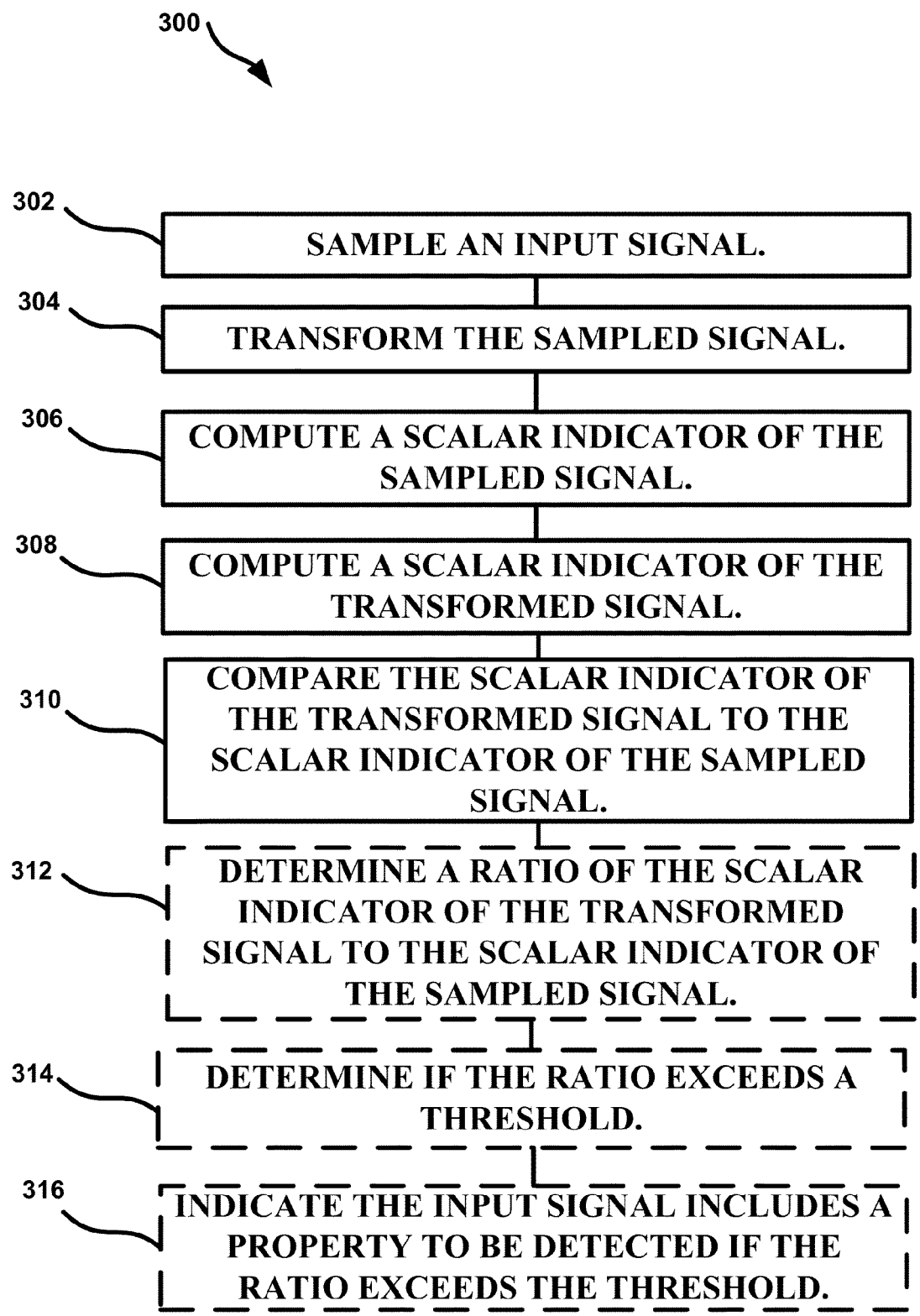
FIG. 3 is a flow diagram of a method of detecting signal oscillations according to an example embodiment.

FIG. 3 is a flow diagram depiction of a method 300 according to an example embodiment. At 302 a signal is sampled. In an example, the signal is sampled at least twice. The signal may be an input signal received from a controller. The sampling may be done by sample module 114. At 304, the sampled signal may be transformed. Any transformation discussed herein may be performed at 304. The transformation may be done using signal transformation module 116. A scalar indicator of the sampled signal may be computed at 306. At 308 a scalar indicator of the transformed signal may be computed. The scalar indicators may be computed using the scalar indicator computation module 118. Any scalar indicator discussed herein may be determined at 306 and 308. The scalar indicators of the sampled signal and the transformed signal may be compared at 310. The comparison may be done using comparison module 120. At 312 a ratio of the scalar indicator of the transformed signal to the scalar indicator of the sampled signal may be determined. It may be determined if the ratio exceeds a selected threshold at 314. If the ratio exceeds the selected threshold then it may be indicated that the input signal includes a property to be detected at 316. Dashed boxes indicate optional acts.

Figure 4A:
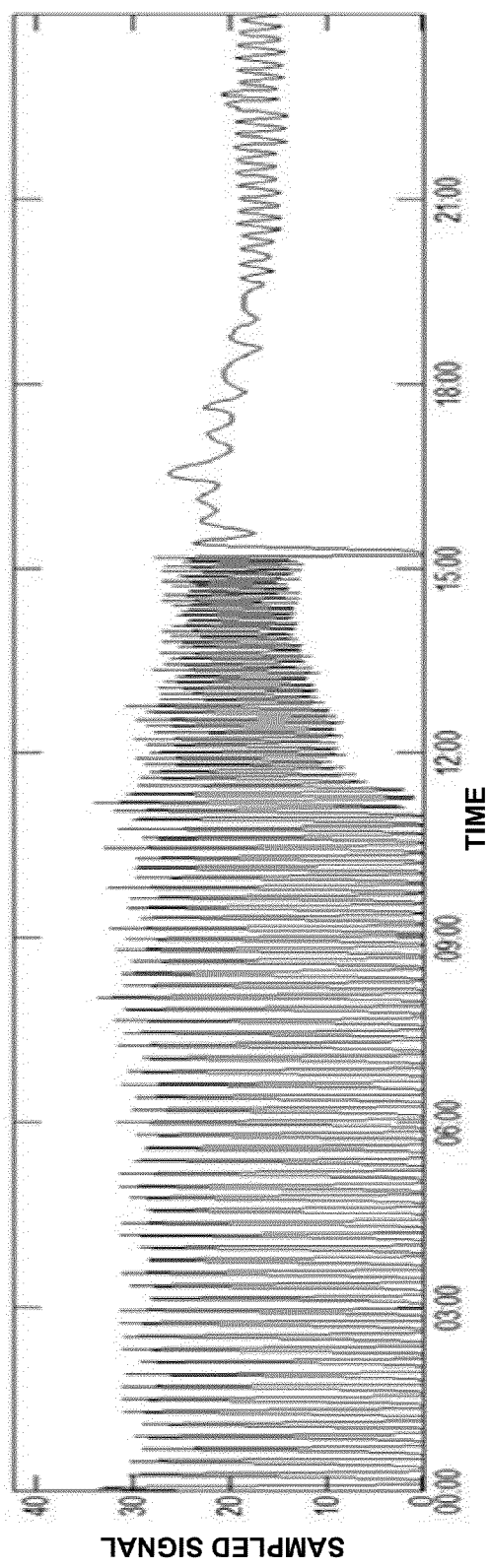
FIG. 4A is a graphic depiction of an example sampled signal in an oscillation detector system according to an example embodiment.

FIG. 4A is a time versus magnitude graph of a sampled signal, according to an example embodiment. The sampled signal may be a sampled version of a control signal from a controller, in an example. In the illustrated example of FIG. 4A the oscillations generally reduce in magnitude and frequency shortly after time 15:00. This general reduction could be due to a retuning of the control parameters for the relevant controller, an actuator became "unstuck," or some other phenomenon not yet understood.

Figure 4B:
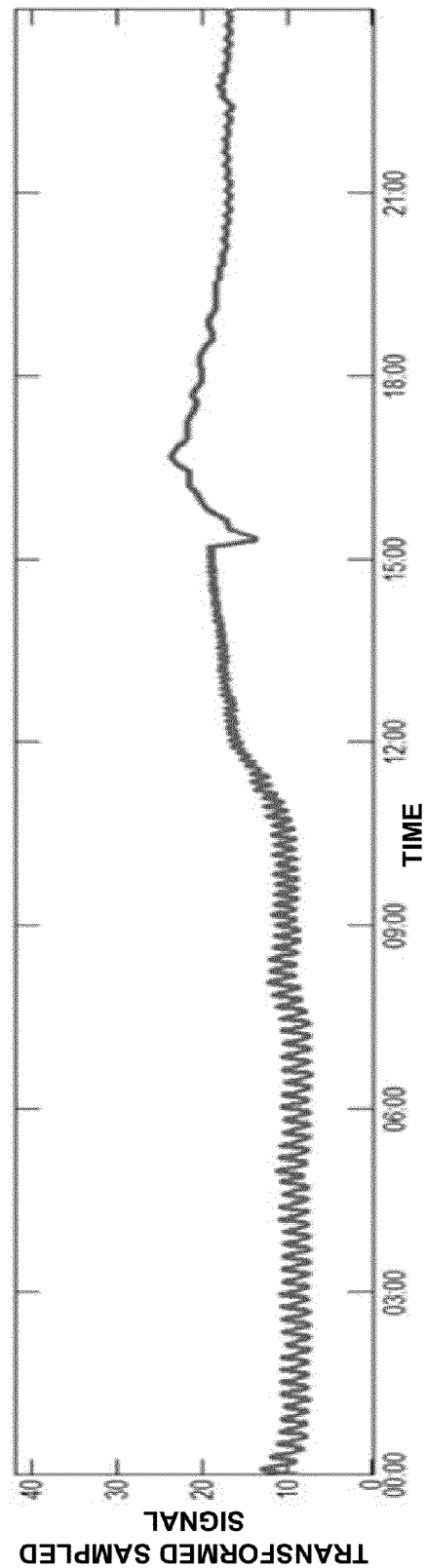
FIG. 4B is a graphic depiction of an example transformed signal in an oscillation detector system according to an example embodiment.

FIG. 4B is a time versus magnitude graph of a transformed sampled signal, according to an exampled embodiment. In an example, the transformed sampled signal may be a band-pass filtered version of the sampled signal, such as the sampled signal in FIG. 4A.

Figure 5:
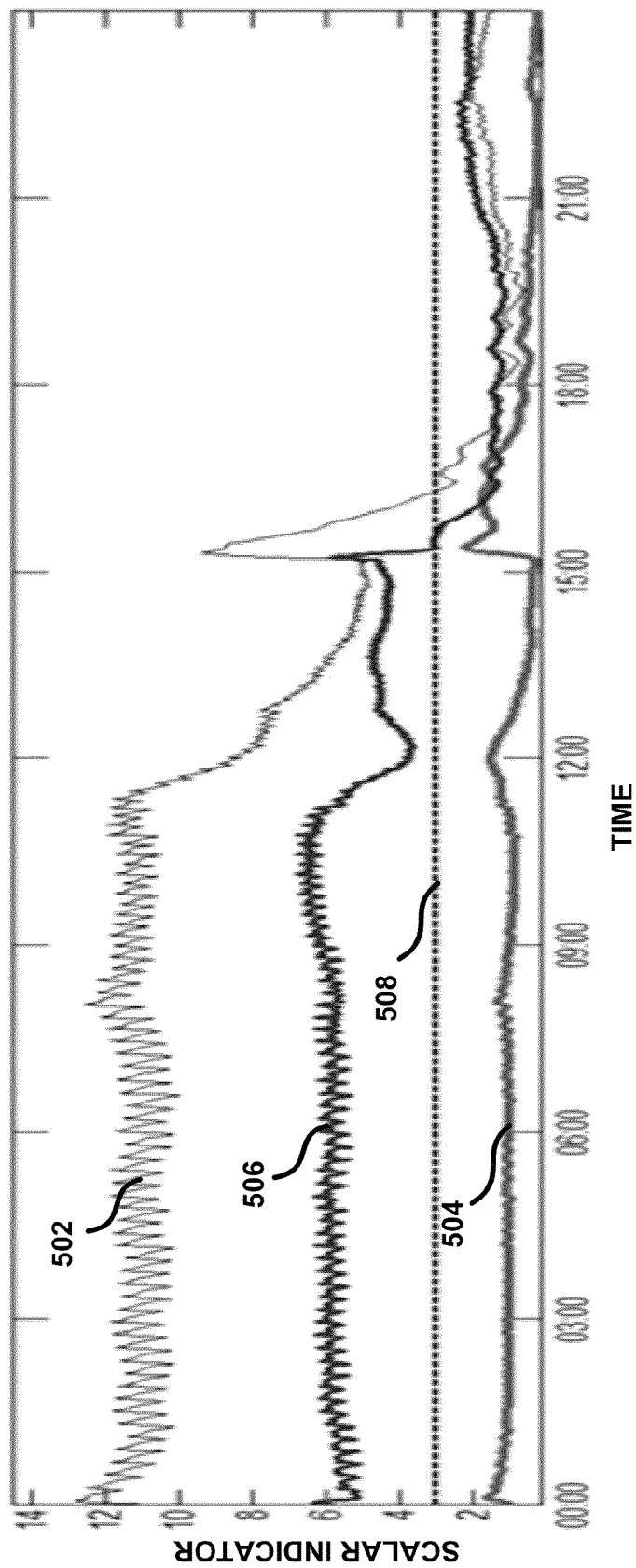
FIG. 5 is a graphic depiction of example computed scalar indicators of a sampled signal and a transformed sampled signal, and a determined ratio of the computed scalar indicators.

FIG. 5 is a time versus magnitude graph of various signals in an oscillation detector system, according to an example embodiment. Scalar indicator signal 502 may represent a determined scalar indicator of a sampled signal, such as the sampled signal in FIG. 4A, in an example. Scalar indicator signal 504 may represent a determined scalar indicator of a transformed sampled signal, such as the transformed sampled signal of FIG. 4B, in an example. In an example, scalar indicator signals 502 and 504 may represent the standard deviation of a sampled signal and a transformed sampled signal, such as the sampled signal of FIG. 4A and the transformed sampled signal of FIG. 4B, respectively. Ratio 506 represents an example comparison of the scalar indicator signals 502 and 504, in an example. Selected threshold 508 is set to three, in this example. If ratio 506 were to exceed selected threshold 508, an indicator signal could be driven high or low to indicate that the raw signal corresponding to the sampled signal includes a property to be detected and recorded. The property to be detected may be oscillations, in an example.

Figure 6:
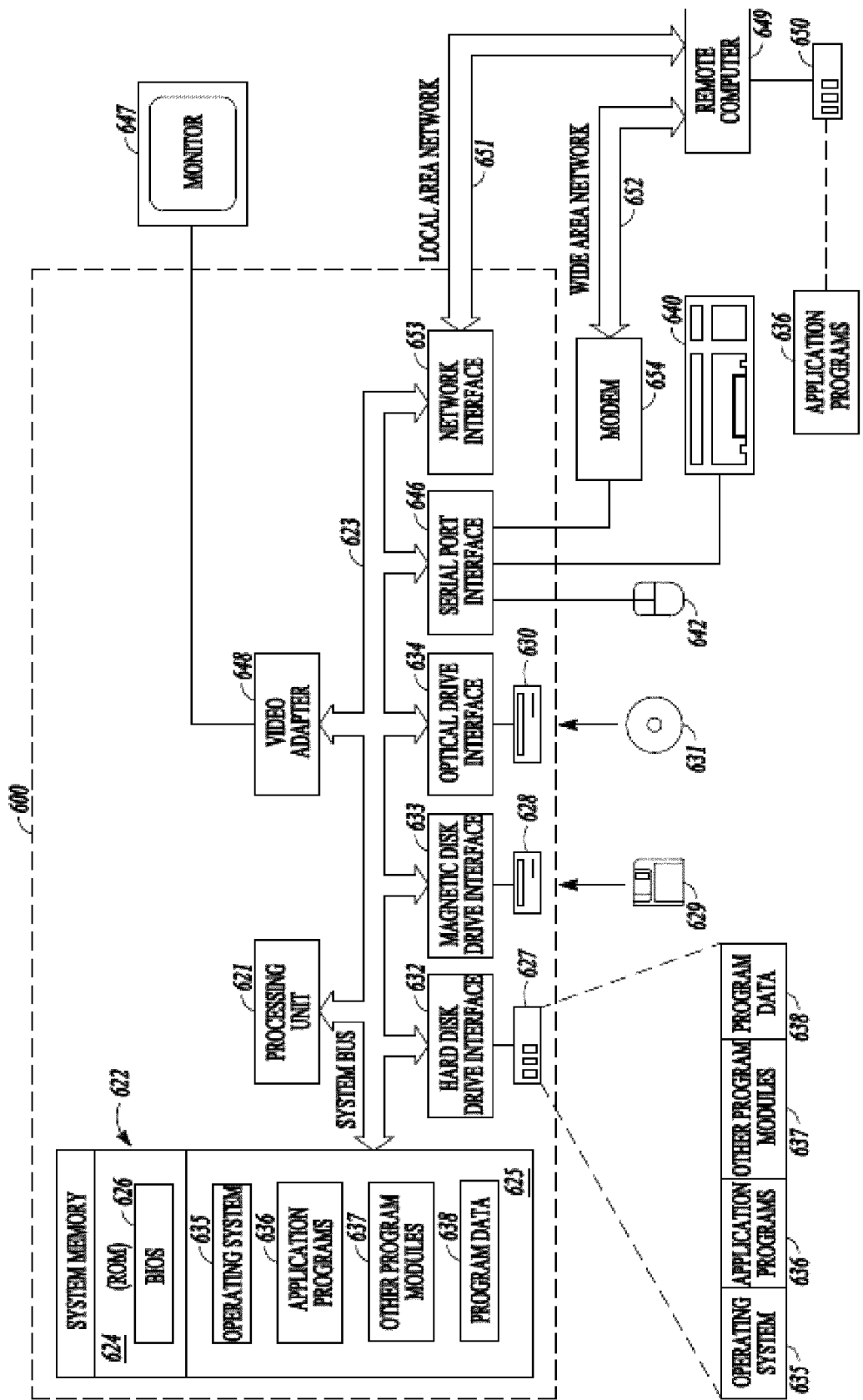
FIG. 6 is a block diagram of a computer system to implement functions and methods, according to an example embodiment.

FIG. 6 is a block diagram of a computer system to implement methods according to an example embodiment. In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of a computer 600 (e.g., a personal computer, workstation, or server), including one or more processing units 621, a system memory 622, and a system bus 623 that operatively couples various system components including the system memory 622 to the processing unit 621. There may be only one or there may be more than one processing unit 621, such that the processor of computer 600 comprises a single central-processing unit (CPU), or a plurality of processing units, commonly referred to as a multiprocessor or parallel-processor environment. In various embodiments, computer 600 is a conventional computer, a distributed computer, or any other type of computer.

The system bus 623 can be any of several types of bus structures including a memory bus or memory controller, a peripheral bus, and a local bus using any of a variety of bus architectures. The system memory can also be referred to as simply the memory, and, in some embodiments, includes read-only memory (ROM) 624 and random-access memory (RAM) 625. A basic input/output system (BIOS) program 626, containing the basic routines that help to transfer information between elements within the computer 600, such as during start-up, may be stored in ROM 624. The computer 600 further includes a hard disk drive 627 for reading from and writing to a hard disk, not shown, a magnetic disk drive 628 for reading from or writing to a removable magnetic disk 629, and an optical disk drive 630 for reading from or writing to a removable optical disk 631 such as a CD ROM or other optical media.

The hard disk drive 627, magnetic disk drive 628, and optical disk drive 630 couple with a hard disk drive interface 632, a magnetic disk drive interface 633, and an optical disk drive interface 634, respectively. The drives and their associated computer-readable media provide non volatile storage of computer-readable instructions, data structures, program modules and other data for the computer 600. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 629, optical disk 631, ROM 624, or RAM 625, including an operating system 635, one or more application programs 636, other program modules 637, and program data 638. Programming for implementing one or more processes or method described herein may be resident on any one or number of these computer-readable media.

A user may enter commands and information into computer 600 through input devices such as a keyboard 640 and pointing device 642. Other input devices (not shown) can include a microphone, joystick, game pad, satellite dish, scanner, or the like. These other input devices are often connected to the processing unit 621 through a serial port interface 646 that is coupled to the system bus 623, but can be connected by other interfaces, such as a parallel port, game port, or a universal serial bus (USB). A monitor 647 or other type of display device can also be connected to the system bus 623 via an interface, such as a video adapter 648. The monitor 647 can display a graphical user interface for the user. In addition to the monitor 647, computers typically include other peripheral output devices (not shown), such as speakers and printers.

The computer 600 may operate in a networked environment using logical connections to one or more remote computers or servers, such as remote computer 649. These logical connections are achieved by a communication device coupled to or a part of the computer 600; the invention is not limited to a particular type of communications device. The remote computer 649 can be another computer, a server, a router, a network PC, a client, a peer device or other common network node, and typically includes many or all of the elements described above I/O relative to the computer 600, although only a memory storage device 650 has been illustrated. The logical connections depicted in FIG. 6 include a local area network (LAN) 651 and/or a wide area network (WAN) 652. Such networking environments are commonplace in office networks, enterprise-wide computer networks, intranets and the internet, which are all types of networks.

When used in a LAN-networking environment, the computer 600 is connected to the LAN 651 through a network interface or adapter 653, which is one type of communications device. In some embodiments, when used in a WAN-networking environment, the computer 600 typically includes a modem 654 (another type of communications device) or any other type of communications device, e.g., a wireless transceiver, for establishing communications over the wide-area network 652, such as the internet. The modem 654, which may be internal or external, is connected to the system bus 623 via the serial port interface 646. In a networked environment, program modules depicted relative to the computer 600 can be stored in the remote memory storage device 650 of remote computer, or server 649. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
   sampling an input signal to create a sampled signal, wherein the input final includes an HVAC control system signal supplied to an actuator;
   transforming the sampled signal to create a transformed signal, wherein transforming the sampled signal includes suppressing a property of the signal to be detected by performing a non-linear operation on the sampled signal, the non-linear operation including at least one of trimming, moving median filtering, de-trending, saturation, and cepstrum filtering;
   computing a first scalar indicator of the sampled signal, wherein the first scalar indicator is responsive to the property of the signal to be detected and wherein the first scalar indicator includes a value of central tendency or a value of shape, wherein the value of central tendency includes at least one of arithmetic mean, geometric mean, harmonic mean, median, midrange, or mode and the value of shape includes at least one of skewness, kurtosis, percentile, quartile, quantile, or moment;
   computing a second scalar indicator of the transformed signal, wherein the second scalar indicator is responsive to the property of the signal to be detected and wherein the second scalar indicator includes a value of central tendency or a value of shape;
   comparing the first scalar indicator to the second scalar indicator including determining a ratio of the scalar indicator of the sampled signal to the scalar indicator of the transformed signal; and
   indicating the input signal includes a specific property when the ratio is greater than a selected threshold.

2. The method of claim 1, wherein transforming the sampled signal includes further processing the sampled signal by performing a linear operation on the transformed signal before computing the second scalar indicator.

3. The method of claim 1, wherein the input signal is received from a controller.

4. The method of claim 3, wherein the controller is a PID controller.

5. The method of claim 1, wherein the ratio is determined in accordance with the formula: (first positive constant+scalar indicator of the sampled signal)/(second positive constant+the scalar indicator of the transformed signal).

6. The method of claim 1, wherein the input signal is a control signal in an HVAC system.

7. An apparatus comprising:
   a signal property detector comprising:
      a sample module that samples an input signal supplied to an actuator from an HVAC control system to create a sampled signal;
      a signal transformation module, wherein the signal transformation module transforms the sampled signal to create a transformed signal and suppresses a property of the signal to be detected by performing a non-linear operation on the sampled signal, the non-linear operation including at least one of trimming, moving median filtering, de-trending, saturation, and cepstrum filtering;

a scalar indicator module, wherein the scalar indicator module determines a scalar indicator of the transformed signal and a scalar indicator of the sampled signal, wherein the scalar indicator is responsive to the property of the signal to be detected and wherein the scalar indicator includes a value of central tendency or a value of shape, wherein the value of central tendency includes at least one of arithmetic mean, geometric mean, harmonic mean, median, midrange, or mode and the value of shape includes at least one of skewness, kurtosis, percentile, quartile, quantile, or moment;

a comparison module, wherein the comparison module compares the scalar indicator of the transformed signal to the scalar indicator of the sampled signal to determine if the input signal is oscillating by determining a ratio of the scalar indicator of the sampled signal to the scalar indicator of the transformed signal; and an output providing an indicator signal, wherein the indicator signal indicates the input signal includes a specific property when the ratio is greater than a selected threshold.

8. The apparatus of claim 7, wherein the signal transformation module further processes the sampled signal by performing a linear operation on the transformed signal before the scalar indicator module computes the second scalar indicator of the transformed signal.

9. The apparatus of claim 7, wherein the input signal is received from a controller and the controller is a PID controller.

10. The apparatus of claim 7, wherein the ratio is determined in accordance with the formula: (first positive constant+the scalar indicator of the sampled signal)/(second positive constant+the scalar indicator of the transformed signal).

11. The apparatus of claim 7, wherein the input signal is a control signal in an HVAC system.

12. A non-transitory computer readable medium that stores instructions, the instructions, which when performed by a machine, cause the machine to perform operations comprising:

sampling an input signal to create a sampled signal, wherein the input final includes an HVAC control system signal supplied to an actuator;

transforming the sampled signal to create a transformed signal, wherein transforming the sampled signal includes suppressing a property of the signal to be detected by performing a non-linear operation on the sampled signal, the non-linear operation including at least one of trimming, moving median filtering, de-trending, saturation, and cepstrum filtering;

computing a first scalar indicator of the sampled signal, wherein the first scalar indicator is responsive to the property of the signal to be detected and wherein the first scalar indicator includes a value of central tendency or a value of shape, wherein the value of central tendency includes at least one of arithmetic mean, geometric mean, harmonic mean, median, midrange, or mode and the value of shape includes at least one of skewness, kurtosis, percentile, quartile, quantile, or moment;

computing a second scalar indicator of the transformed signal, wherein the second scalar indicator is responsive to the property of the signal to be detected and wherein the second scalar indicator includes a value of central tendency or a value of shape;

comparing the first scalar indicator to the second scalar indicator including determining a ratio of the scalar indicator of the sampled signal to the scalar indicator of the transformed signal; and indicating the input signal includes the specific property when the ratio is greater than a selected threshold.

13. The storage device of claim 12, wherein the transforming the sampled signal includes both band-pass filtering the sampled signal, and includes at least one of trimming, moving median filtering, de-trending, saturation, and cepstrum filtering.

14. The storage device of claim 12, wherein the ratio is determined in accordance with the formula: (first positive constant+the scalar indicator of the sampled signal)/(second positive constant+the scalar indicator of the transformed signal).

* * * * *